(12) United States Patent
Lee et al.

(10) Patent No.: US 6,524,738 B1
(45) Date of Patent: Feb. 25, 2003

(54) LITHIUM BATTERY INCORPORATING PROTECTIVE POSITIVE TEMPERATURE COEFFICIENT MATERIAL

(75) Inventors: Yong-beom Lee, Cheonan (KR); Yun-seok Choi, Cheonan (KE); Jin-soo Lee, Cheonan (KR); Se-jong Han, Cheonan (KR); Ki-ho Kim, Cheonan (KR)

(73) Assignee: Samsung SDI Co., Ltd., Kyungki-do (KR)

( * ) Notice: Subject to any disclaimer, the term of this patent is extended or adjusted under 35 U.S.C. 154(b) by 0 days.

(21) Appl. No.: 09/550,612

(22) Filed: Apr. 17, 2000

(30) Foreign Application Priority Data

Apr. 21, 1999 (KR) .............................. 99-14264

(51) Int. Cl.[7] .............................. H01M 10/50
(52) U.S. Cl. .................. 429/59; 429/62; 429/231.95
(58) Field of Search .............. 429/49, 57, 59, 429/62, 209, 231.95

(56) References Cited

U.S. PATENT DOCUMENTS 6,346,345 B2   2/2002   Shiota et al.

FOREIGN PATENT DOCUMENTS

| EP | 0851517 A1 | * | 7/1998 |
| JP | 06-231749 A | * | 8/1994 |
| JP | 07-220755 A | * | 8/1995 |
| JP | 08-096792 A | * | 4/1996 |
| JP | 10-241665 | | 9/1998 |

* cited by examiner

*Primary Examiner*—Patrick Ryan
*Assistant Examiner*—Susy Tsang-Foster
(74) *Attorney, Agent, or Firm*—Leydig, Voit & Mayer, Ltd.

(57) ABSTRACT

A lithium secondary battery has an electrode assembly including a positive electrode plate having a positive electrode current collector and a positive electrode sheet fixed to at least one surface of the positive electrode current collector and having a positive electrode active material as a main component, a negative electrode plate having a negative electrode current collector and a negative electrode sheet fixed to at least one surface of the negative electrode current collector and having a negative electrode active material as a main component, and a separator interposed between the positive electrode plate and the negative electrode plate. A current controller for cutting off current at a minimum temperature is present on each of the positive and negative electrode plates.

4 Claims, 3 Drawing Sheets

LITHIUM BATTERY INCORPORATING PROTECTIVE POSITIVE TEMPERATURE COEFFICIENT MATERIAL

BACKGROUND OF THE INVENTION

1. Field of the Invention

The present invention relates to a lithium secondary battery, and more particularly, to a secondary battery which has an improved structure by which the safety of the battery is improved.

2. Description of the Related Art

In general, secondary batteries are capable of charging, unlike primary batteries which are incapable of charging and are widely applied to portable electronic apparatus such as cellular phones, notebook-type computers, camcorders and the like. In particular, since the lithium secondary batteries have a service life three times longer than Ni-Cd batteries or Ni-MH batteries and excellent energy density per unit weight, they are in widespread use.

Lithium secondary batteries are classified into liquid electrolyte batteries and polymer electrolyte batteries according to the type of electrolyte used. Generally, batteries using a liquid electrolyte are called lithium ion batteries and batteries using polymer electrolyte are called lithium polymer batteries.

Here, lithium secondary batteries may have various shapes. Typically, cylindrical or prismatic batteries are fabricated to be used mainly as lithium-ion batteries. Lithium polymer secondary batteries have flexibility so that they are relatively free in view of shape design. Accordingly, lithium polymer secondary batteries having excellent safety and freedom in shape design and being light-weight are advantageous in attaining miniaturized and light-weight portable electronic apparatus, and research into the lithium polymer secondary battery is being carried out in various manners.

FIG. 1 is a perspective view illustrating an electrode assembly of a conventional lithium secondary battery.

Referring to FIG. 1, the electrode assembly includes has a positive electrode plate 11 and a negative electrode plate 12 stacked sequentially, with a separator 13 being interposed therebetween. A positive electrode tab 14 and a negative electrode tab 15 are drawn out at each one side of the positive and negative electrode plates 11 and 12, respectively. The positive electrode plate 11 includes a positive electrode current collector 16 made of aluminum foil and a positive electrode sheet 17 fixed to at least one surface of the positive electrode current collector 16 and having a positive electrode active material as a main component, a binder, a conductive material and a plasticizer. In FIG. 1, the positive electrode sheet 17 is fixed to both surfaces of the positive electrode current collector 16.

Also, like the positive electrode plate 11, the negative electrode plate 12 includes a negative electrode current collector 18 made of copper foil and a negative electrode sheet 19 fixed to at least one surface of the negative electrode current collector 18 and having a negative electrode active material as a main component, a binder, a conductive material and a plasticizer. In FIG. 1, the negative electrode sheet 19 is fixed to both surfaces of the negative electrode current collector 18.

In the electrode assembly having the aforementioned configuration, the positive electrode sheet 17 and the negative electrode sheet 19 are fused to the positive electrode current collector 16 and the negative electrode current collector 18 in a laminating process. After fusion, the plasticizer is extracted from the positive and negative electrode plates 11 and 12 and then an electrolyte is impregnated into the space produced by extracting the plasticizer, thereby fabricating the electrode assembly.

The lithium polymer secondary battery having the above-described electrode assembly is fabricated in a packaged state, and a safety device is used in each battery cell and the package. The safety device protects the battery by cutting off the current in an event of a rise in the battery temperature or the internal pressure, or by discharging the pressure outside of the battery.

The rise in the battery temperature or pressure may be caused by overcharging or external shorts. In order to ensure safety, various types of lithium secondary batteries are being currently developed. However, there have never been safety devices adapted to positive and negative electrode plates in conjunction with battery safety.

SUMMARY OF THE INVENTION

To solve the above problems, it is an object of the present invention to provide a secondary battery having an improved structure in which each current controller for ensuring the battery safety is installed on positive and negative electrode plates.

A further lithium secondary battery according to the invention includes an electrode assembly, the electrode assembly comprising a positive electrode plate having an inner surface and an outer surface, a positive electrode current collector having first and second surfaces, a positive electrode sheet fixed to at least one of the first and second surfaces of the positive electrode current collector and having a positive electrode active material as a main component, and first and second layers of a positive temperature coefficient material that cuts off current flow when the positive temperature coefficient material reaches at least a predetermined temperature, coating opposite sides of the positive electrode current collector and defining the inner and outer surfaces of the positive electrode plate, respectively; a negative electrode plate having an inner surface and an outer surface, a negative electrode current collector having first and second surfaces, a negative electrode sheet fixed to at least one of the first and second surfaces of the negative electrode current collector and having a negative electrode active material as a main component, and third and fourth layers of the positive temperature coefficient material coating opposite sides of the negative electrode current collector and the negative electrode sheet and defining the inner and outer surfaces of the negative electrode plate, respectively; and a separator interposed between and contacting the inner surface of the positive electrode and the negative electrode plate.

A further lithium secondary battery according to the invention includes an electrode assembly comprising a positive electrode plate having an inner surface and an outer surface, a positive electrode current collector having first and second surfaces, a positive electrode sheet fixed to at least one of the first and second surfaces of the positive electrode current collector and having a positive electrode active material as a main component; first and second layers of a positive temperature coefficient material that cuts off current flow when the positive temperature coefficient material reaches at least a predetermined temperature, disposed on opposite sides of the positive electrode current collector and defining the inner and outer surfaces of the positive electrode plate, respectively; and a negative electrode plate having an inner surface and an outer surface, a negative electrode current collector having first and second surfaces, a negative electrode sheet fixed to at least one of the first and second surfaces of the negative electrode current collector and having a negative electrode active material as a main component, and third and fourth layers of the positive temperature coefficient material disposed on opposite sides of the negative electrode current collector and defining the inner and outer surfaces of the negative electrode plate, respectively; and a separator interposed between and contacting the inner surfaces of the positive and negative electrode plates.

BRIEF DESCRIPTION OF THE DRAWINGS

The above object and advantages of the present invention will become more apparent by describing in detail a preferred embodiment thereof with reference to the attached drawings in which.

DESCRIPTION OF THE PREFERRED EMBODIMENT

Preferred embodiments of the present invention will now be described in detail with reference to the accompanying drawings.

Figure 1:
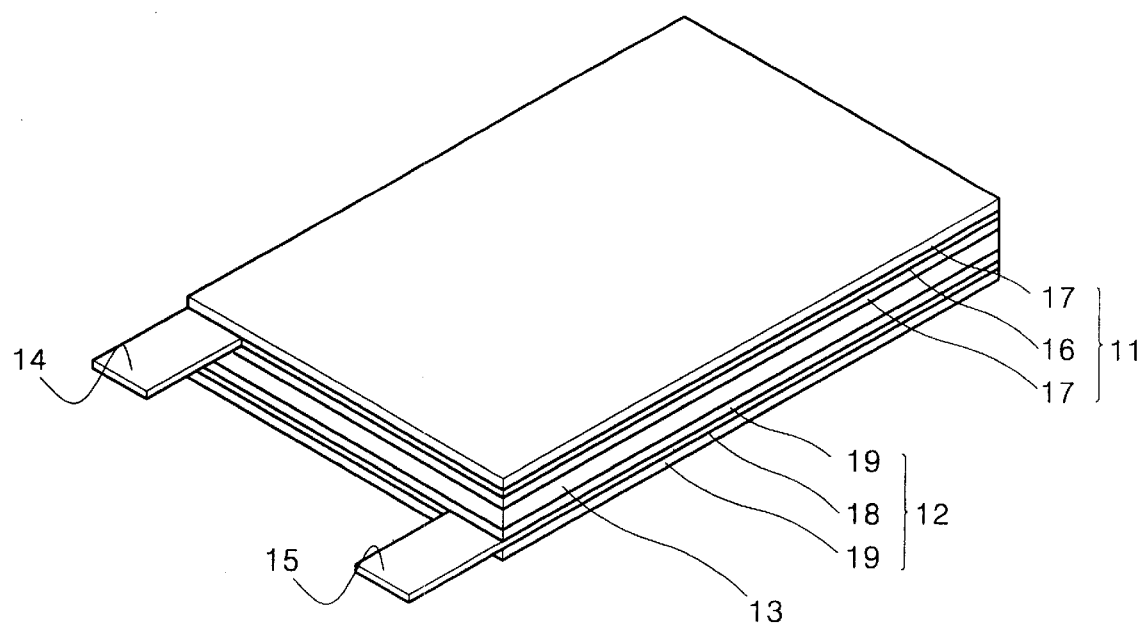
FIG. 1 is a perspective view illustrating an electrode assembly of a conventional secondary battery.
Figure 2:
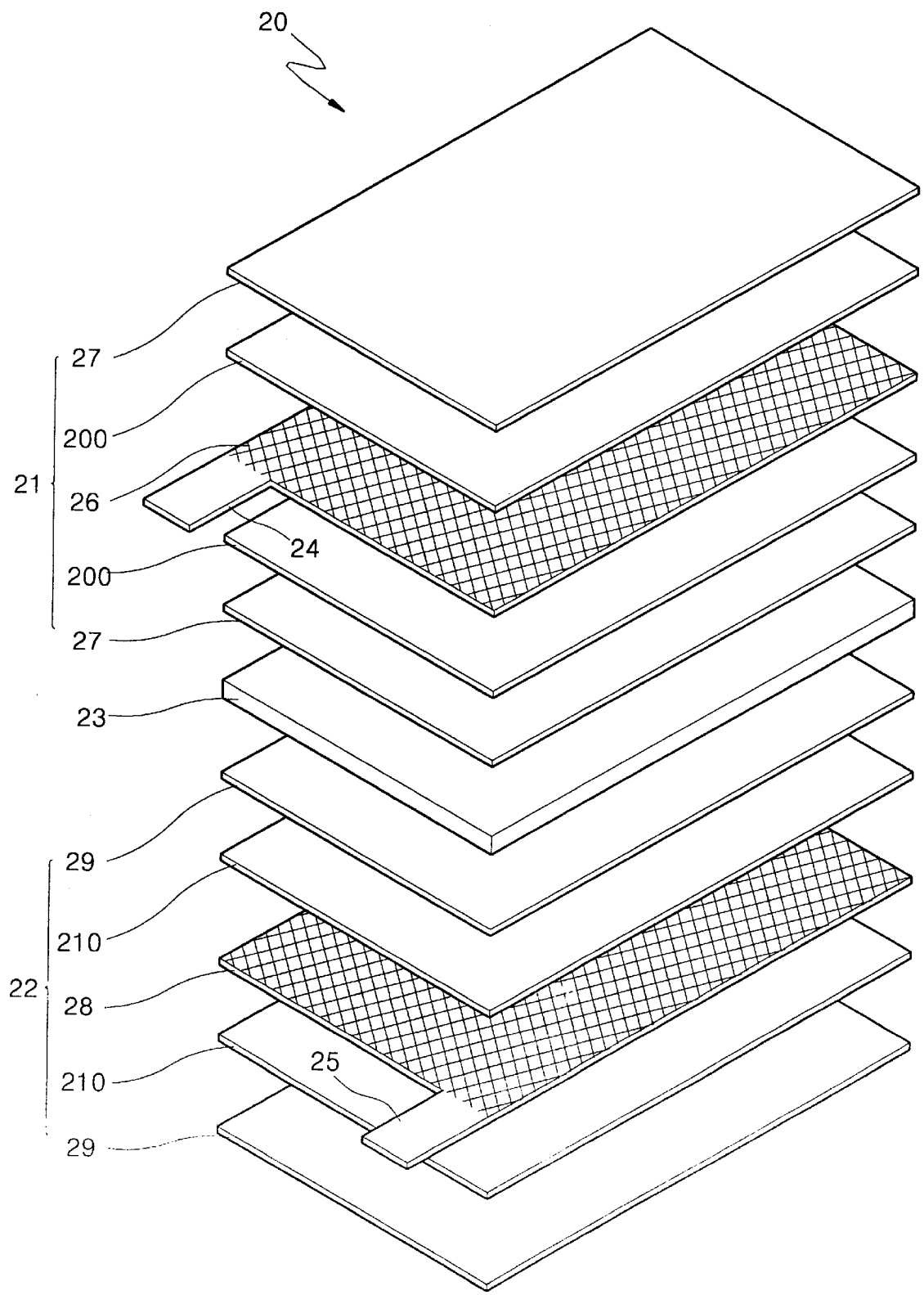
FIG. 2 is a partly cut-away exploded view schematically illustrating an electrode assembly of a secondary battery according to a first embodiment of the present invention.

FIG. 2 is a partly cut-away exploded view schematically illustrating an electrode assembly of a secondary battery according to a first embodiment of the present invention.

Referring to FIG. 2, an electrode assembly 20 includes a positive electrode plate 21 and a negative electrode plate 22 stacked sequentially, with a separator 23 being interposed therebetween. A positive electrode tab 24 and a negative electrode tab 25 are drawn out at one side of the positive and negative electrode plates 21 and 22, respectively.

The positive electrode plate 21 includes a positive electrode current collector 26 made of aluminum foil and a positive electrode sheet 27 fixed to at least one surface of the positive electrode current collector 26 and having a positive electrode active material, e.g., lithium oxide, as a main component, a binder, a conductive material and a plasticizer.

Also, the negative electrode plate 22 includes a negative electrode current collector 28 made of copper foil and a negative electrode sheet 29 fixed to at least one surface of the negative electrode current collector 28 and having a negative electrode active material, e.g., a carbon material, as a main component, a binder, a conductive material and a plasticizer.

Here, the positive and negative electrode sheets 27 and 29 are a slurry, each coats one surface of the positive and negative electrode current collectors 26 and 28 and is fused for fixing in a laminating process. Here, a first current controller 200 is present between the positive electrode current collector 26 and the positive electrode sheet 27, and a second current controller 210 is present between the negative electrode current collector 28 and the negative electrode sheet 29.

The first and second current controllers 200 and 210 are coated with a positive temperature coefficient (PTC) material in which a paste-type polymer and a carbon material are mixed. The PTC material serves as a resistor material whose zero-load resistance increases according to an increase in temperature and conducts to cause an electrochemical reaction between the positive electrode plate 21 and the negative electrode plate 22 at a battery driving temperature ranging from −20° C. to 60° C. On the other hand, the PTC material serves as an insulator material for cutting off current flow at temperatures ranging from 100° C. to 200° C., in which overcharging or discharging occurs, by increasing the internal resistance.

Figure 3:
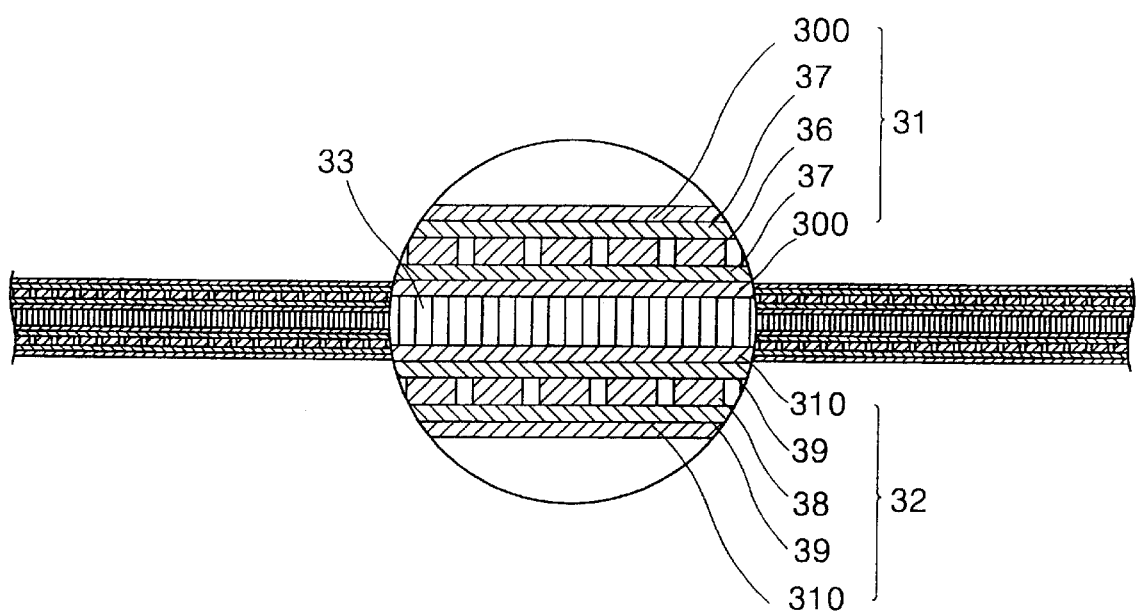
FIG. 3 is a partly enlarged cross-sectional view schematically illustrating an electrode assembly of a secondary battery according to a second embodiment of the present invention.

As shown in FIG. 3, first and second current controllers 300 and 310 may be located on the outermost layers of the positive and negative electrode plates of the battery. In other words, a positive electrode plate 31 and a negative electrode plate 32 stacked in sequence with a separator 33, interposed therebetween, include a positive electrode current collector 36 and a negative electrode current collector 38, respectively, as in the first embodiment shown in FIG. 2. Also, a positive electrode sheet 37 and a negative electrode sheet 39 having a positive electrode active material and a negative electrode active material, respectively, are fixed to at least each one surface of each of the positive and negative electrode current collectors 36 and 38.

A first current controller 300 made of a PTC material is present on the outer surface of the positive electrode sheet 37, and a second current controller 310 made of the same material is located on the outer surface of the negative electrode sheet 39.

The lithium secondary battery having the aforementioned configuration increases internal resistance rapidly by the action of the first current controller 200 or 300 and the second current controller 210 or 310 when the internal temperature of the battery rises due to overcharging or an abnormality, thereby cutting off the current to terminate electrode reactions, thus protecting the battery.

As described above, according to the lithium secondary battery of the present A invention, PTC materials coat the outer surfaces of positive and negative electrode current collectors or sheets to cause short-circuiting in the battery in the event of overheating of the battery due to overcharging or a abnormality, thereby improving the battery safety.

While the present invention has been described with respect to what is presently considered to be the preferred embodiment, it is to be understood that the disclosed embodiment is provided only for an exemplary embodiment. To the contrary, the present invention is intended to cover various modifications and equivalent arrangements included within the spirit and scope of the appended claims. Accordingly, the true scope and spirit of the invention will be indicated by the following claims.

What is claimed is:

1. A lithium secondary battery having an electrode assembly, the electrode assembly comprising:

a positive electrode plate having an inner surface and an outer surface, a positive electrode current collector having first and second surfaces, a positive electrode sheet fixed to at least one of the first and second surfaces of the positive electrode current collector and having a positive electrode active material as a main component, and first and second layers of a positive temperature coefficient material that cuts off current flow when the positive temperature coefficient material reaches at least a predetermined temperature, coating opposite sides of the positive electrode current collector and defining the inner and outer surfaces of the positive electrode plate, respectively, a negative electrode plate having an inner surface and an outer surface, a negative electrode current collector having first and second surfaces, a negative electrode sheet fixed to at least one of the first and second surfaces of the negative electrode current collector and having a negative electrode active material as a main component, and third and fourth layers of the positive temperature coefficient material coating opposite sides of the negative electrode current collector and the negative electrode sheet and defining the inner and outer surfaces of the negative electrode plate, respectively, and a separator interposed between and contacting the inner surfaces of the positive electrode plate and the negative electrode plate.

2. The lithium secondary battery according to claim 1, wherein the positive temperature coefficient material cuts off current flow at a temperature ranging from 100° C. to 200° C.

3. A lithium secondary battery having an electrode assembly, the electrode assembly comprising:

a positive electrode plate having an inner surface and an outer surface, a positive electrode current collector having first and second surfaces, a positive electrode sheet fixed to at least one of the first and second surfaces of the positive electrode current collector and having a positive electrode active material as a main component, and first and second layers of a positive temperature coefficient material that cuts off current flow when the positive temperature coefficient material reaches at least a predetermined temperature, disposed on opposite sides of the positive electrode current collector and defining the inner and outer surfaces of the positive electrode plate, respectively;

a negative electrode plate having an inner surface and an outer surface, a negative electrode current collector having first and second surfaces, a negative electrode sheet fixed to at least one of the first and second surfaces of the negative electrode current collector and having a negative electrode active material as a main component, and third and fourth layers of the positive temperature coefficient material disposed on opposite sides of the negative electrode current collector and defining the inner and outer surfaces of the negative electrode plate, respectively; and a separator interposed between and contacting the inner surfaces of the positive and negative electrode plates.

4. The lithium secondary battery according to claim 3, wherein the positive temperature coefficient material cuts off current flow at a temperature ranging from 100° C. to 200° C.

* * * * *